US012240721B2

(12) United States Patent
Düsterhus et al.

(10) Patent No.: US 12,240,721 B2
(45) **Date of Patent: *Mar. 4, 2025**

(54) DEVICE FOR HANDLING NOTES OF VALUE

(71) Applicant: Wincor Nixdorf International GmbH, Paderborn (DE)

(72) Inventors: Richard Düsterhus, Paderborn (DE); Karl-Heinz Seroka, Salzkotten (DE); Dennis Mols, Paderborn (DE)

(73) Assignee: Wincor Nixdorf International GbmH, Paderborn (DE)

( * ) Notice: Subject to any disclaimer, the term of this patent is extended or adjusted under 35 U.S.C. 154(b) by 166 days.

This patent is subject to a terminal disclaimer.

(21) Appl. No.: 17/690,529

(22) Filed: Mar. 9, 2022

(65) Prior Publication Data

US 2022/0194731 A1 Jun. 23, 2022

Related U.S. Application Data

(63) Continuation of application No. 16/870,878, filed on May 8, 2020, now Pat. No. 11,276,264.

(30) Foreign Application Priority Data

May 10, 2019 (EP) .................................... 19173698

(51) Int. Cl.
*B65H 29/60* (2006.01)
*G07D 11/23* (2019.01)
(Continued)

(52) U.S. Cl.
CPC ............. *B65H 29/60* (2013.01); *G07D 11/23* (2019.01); *G07D 11/50* (2019.01);
(Continued)

(58) Field of Classification Search
CPC ............ B65H 29/60; B65H 2404/1114; B65H 2701/1912; G07D 11/23; G07D 11/50;
(Continued)

(56) References Cited

U.S. PATENT DOCUMENTS 5,815,592 A * 9/1998 Mennie .................. G07D 11/50 382/137
11,922,751 B2 * 3/2024 Dusterhus .............. G07D 11/14
(Continued)

FOREIGN PATENT DOCUMENTS

DE 102008018935 A1 10/2009
DE 102009006810 A1 8/2010
(Continued)

OTHER PUBLICATIONS

Office Action filed in the corresponding Chinese application dated Aug. 19, 2022; 11 pages.
(Continued)

*Primary Examiner* — Jeffrey A Shapiro
(74) *Attorney, Agent, or Firm* — Black McCuskey

(57) ABSTRACT

A device for handling notes of value comprises a sensor unit for detecting at least one feature of a least one note of value to be dispensed. A control unit distinguishes depending on the feature detected by the sensor unit whether the at least one note of value is a first note of value that is approved for withdrawal or a second note of value that is not approved for withdrawal and activates a switch unit such that the at least one note of value is fed to an intermediate storage when it is a second note of value. The intermediate storage comprises a transport unit which is drivable in a first direction for feeding the second note of value and which is drivable into a second direction such that the second note of value can be conveyed out of the intermediate storage.

18 Claims, 8 Drawing Sheets

(51) Int. Cl.
*G07D 11/50* (2019.01)
*G07D 11/18* (2019.01)
*G07D 11/40* (2019.01)

(52) U.S. Cl.
CPC ................. *B65H 2404/1114* (2013.01); *B65H 2701/1912* (2013.01); *G07D 11/18* (2019.01); *G07D 11/40* (2019.01)

(58) Field of Classification Search
CPC ...... G07D 11/18; G07D 11/40; G07D 11/165; G07D 11/25; G07D 7/181; G07F 19/00; G07F 9/10; G07F 19/201
See application file for complete search history.

(56) References Cited

U.S. PATENT DOCUMENTS

| | | | | |
|---|---|---|---|---|
| 2004/0135304 | A1 | 7/2004 | Tokunaga | |
| 2005/0091159 | A1* | 4/2005 | Ichikawa | G06Q 20/10 705/40 |
| 2008/0050149 | A1* | 2/2008 | Parks | G03G 21/1638 399/124 |
| 2009/0229947 | A1* | 9/2009 | Takai | G07D 11/50 194/217 |
| 2014/0039673 | A1* | 2/2014 | Sakamoto | G07D 11/36 700/244 |
| 2014/0331612 | A1* | 11/2014 | Jeschke | B65B 25/14 53/540 |
| 2015/0371480 | A1* | 12/2015 | Luo | B65H 31/3045 271/1 |
| 2016/0236901 | A1* | 8/2016 | Moriwaki | B65H 83/025 |
| 2017/0267482 | A1* | 9/2017 | Matsumoto | G07D 11/18 |
| 2018/0300990 | A1* | 10/2018 | Kim | G07D 11/20 |

FOREIGN PATENT DOCUMENTS

| | | | |
|---|---|---|---|
| EP | 2101301 | A1 | 9/2009 |
| EP | 2940662 | A1 | 11/2015 |
| WO | 2015136780 | A1 | 9/2015 |

OTHER PUBLICATIONS

Extended European Search Report, written in German language. Published Nov. 22, 2019.
English translation of the Extended European Search Report, Published Nov. 22, 2019.

* cited by examiner

DEVICE FOR HANDLING NOTES OF VALUE

CROSS-REFERENCE TO RELATED APPLICATIONS

This application is a Continuation of U.S. patent application Ser. No. 16/870,878, filed May 8, 2020, which claims priority to and the benefit of European Patent Application No. 19173698.2, filed May 10, 2019, the contents of both of which are hereby incorporated by reference in their entirety.

BACKGROUND AND SUMMARY

The invention relates to a device for handling notes of value with a sensor unit for detecting at least one feature of at least one note of value to be dispensed and with a control unit which is configured to distinguish depending on the feature detected by the sensor unit whether the at least one note of value is a first note of value that is approved for withdrawal or a second note of value that is not approved for withdrawal. The control unit is further configured to activate a switch unit such that the at least one note of value is fed to an intermediate storage when the note of value is a second note of value.

When separating notes of value from value note boxes for the withdrawal of a requested amount of money by an automated teller machine, so-called multiple pull-offs may occur, i.e. several at least partially overlapping notes of value are jointly taken from a value note box. Such multiple pull-offs may in particular occur in the case of dirty or sticky notes of value. Known value note machines have in particular thickness sensors, with the aid of which the thickness of the removed notes of value can be determined. By means of the thickness, it may be determined whether there is a multiple pull-off. When a multiple pull-off has been detected, the notes of value of this multiple pull-off are not dispensed but transported into a so-called reject box provided for this purpose. For dispensing the amount of money, corresponding further notes of value are taken from the value note boxes.

From the prior art, automated teller machines are known in which the notes of value of a multiple pull-off are at first transported into an intermediate storage. Subsequently, the notes of value are individually taken from the intermediate storage and fed to a reading unit, with the aid of which the denomination of the notes of value is determined. This automated teller machine has the disadvantage that an own separating unit for separating the notes of value of the intermediate storage has to be provided. Moreover, drum storages are used as intermediate storages so that a corresponding large construction height has to be provided for the intermediate storage.

From document EP 2 940 662 A1, a method is known in which the notes of value of a multiple pull-off are transported into an input and/or output compartment for the input and/or output of notes of value, from which these notes of value are separated and fed to a reading unit. This method has the disadvantage that complex control operations are necessary for operating the device.

It is the object of the invention to specify a device in which notes of value that are not suited for withdrawal cannot be output.

This object is solved by a device having the features of claim 1. Advantageous developments are specified in the dependent claims.

The intermediate storage of the device according to claim 1 comprises a transport unit which is drivable in a first direction for feeding the second note of value.

The transport unit is drivable in a second direction such that the second note of value can be conveyed out of the intermediate storage. As a result, an easy and reliable sorting out of those notes of value which are not approved for withdrawal is achieved during a withdrawal operation.

It is advantageous when the transport unit comprises at least one vane wheel with at least one vane, at least one first transport roller and/or at least one second transport roller. As a result, the notes of value are fed to the intermediate storage in a reliable manner.

Further, it is advantageous when the first transport roller and the vane wheel are arranged on a first shaft in a rotationally fixed manner and the second transport roller is arranged on a second shaft in a rotationally fixed manner, or when the first transport roller is arranged on a first shaft, the second transport roller is arranged on a second shaft and the vane wheel is arranged on a third shaft in a rotationally fixed manner, respectively. As a result, a particularly compact arrangement of the elements of the transport unit is achieved, which in particular requires a low construction height.

In an advantageous embodiment, at least one drive unit for driving the first, the second and/or the third shaft is provided, the first shaft and the second shaft or the first shaft, the second shaft and the third shaft preferably being connected to each other via a gearing, in particular a toothed gearing. As a result, a particularly easy drive of the transport elements is achieved.

It is particularly advantageous when the intermediate storage comprises a deposit element with a deposit surface, wherein, when the second note of value is fed into the intermediate storage, it may be deposited on the deposit surface lying on its front or back, or when the second note of value is deposited on a note of value already deposited with its front or back on the deposit surface such that it forms a value note stack together with the note of value already deposited on the deposit surface. As a result, a compact deposit of the notes of value on the deposit surface is achieved.

Further, it is advantageous when the intermediate storage comprises at least one press-on element which is configured to exert a press-on force toward the deposit surface on the note of value or the value note stack stored in the intermediated storage. As a result, it is prevented that a newly fed note of value hits the edge of an already deposited note of value. The newly deposited note of value rather slides over the already deposited note of value or the present value note stack.

Further, it is advantageous when the vane of the vane wheel is configured to exert a press-on force toward the deposit surface on the note of value stored in the intermediate storage or the present value note stack when the vane wheel is rotated in the first direction. As a result, a reliable deposit of the note of value in the intermediate storage is guaranteed and in particular a crumpling of the note of value during the deposit is prevented.

It is particularly advantageous when the vane of the vane wheel is configured to lift the note of value or the value note stack against the press-on force of the press-on element away from the deposit surface when driving the transport unit in the second direction. As a result, a reliable transport of the note of value out of the intermediate storage is guaranteed.

In an advantageous embodiment, the vane is a first vane of the vane wheel, and the vane wheel comprises at least one second vane, the first and the second vane exerting a press-on force toward the deposit surface on the note of value or the value note stack stored in the intermediate storage when rotating the vane wheel in a first direction, and the first and the second vane lifting the note of value or the value note stack against the press-on force of the press-on element away from the deposit surface when rotating the vane wheel in the second direction. As a result, on the one hand a reliable deposit of the notes of value and on the other hand a safe transport out of the intermediate storage is achieved with the aid of the vane wheel or the vane wheels. The first vane and the second vane are preferably arranged at a distance of 180 .degree. on a hub of the vane wheel. When the vane wheel has three or more vanes, these are preferably arranged to each other at equal angular distance.

Further, it is advantageous when the device comprises at least one further value note storage, in particular a value note box for storing notes of value to be dispensed, and/or a reject and/or retract container for the deposit of sorted-out notes of value and/or notes of value not removed from the output compartment. As a result, it is guaranteed that the sorted-out notes of value that were not intended for withdrawal are removed from the value note circulation.

Further, it is advantageous when the intermediate storage and the at least one value note storage are arranged in a safe module of the device. As a result, a compact structure of the device is guaranteed.

Further, it is advantageous when the control unit is configured to activate a switch such that a transport of the at least one note of value to be dispensed into a value note output unit arranged in a head module of the device takes place when the note of value is a first note of value. This guarantees that the notes of value intended for withdrawal are actually fed to the value note output unit and can be output therefrom.

It is particularly advantageous when the feature detected by the sensor unit comprises a thickness and/or dimensions of the at least one note of value and/or at least one safety feature, in particular an optical safety feature, preferably an infrared color, a watermark, a safety thread, a serial number and/or a microprinting. As a result, it is guaranteed that notes of value that are not intended for withdrawal do not reach the value note output unit.

Further, it is advantageous when the intermediate storage comprises a cover element that is arranged above the deposit surface pivotably about an axis of rotation transverse to a feed direction of the at least one note of value. As a result, an easy handling of the intermediate storage is achieved. In particular, in the case of malfunctions, such as paper jams, easy access to the intermediate storage is possible.

Further, it is advantageous when the press-on element is pivotably connected to the cover element. As a result, a reliable connection of the press-on element to the intermediate storage is guaranteed and a compact structure is achieved.

Further features and advantages result from the following description which explains embodiments in more detail in connection with the enclosed figures.

DETAILED DESCRIPTION

Figure 1:
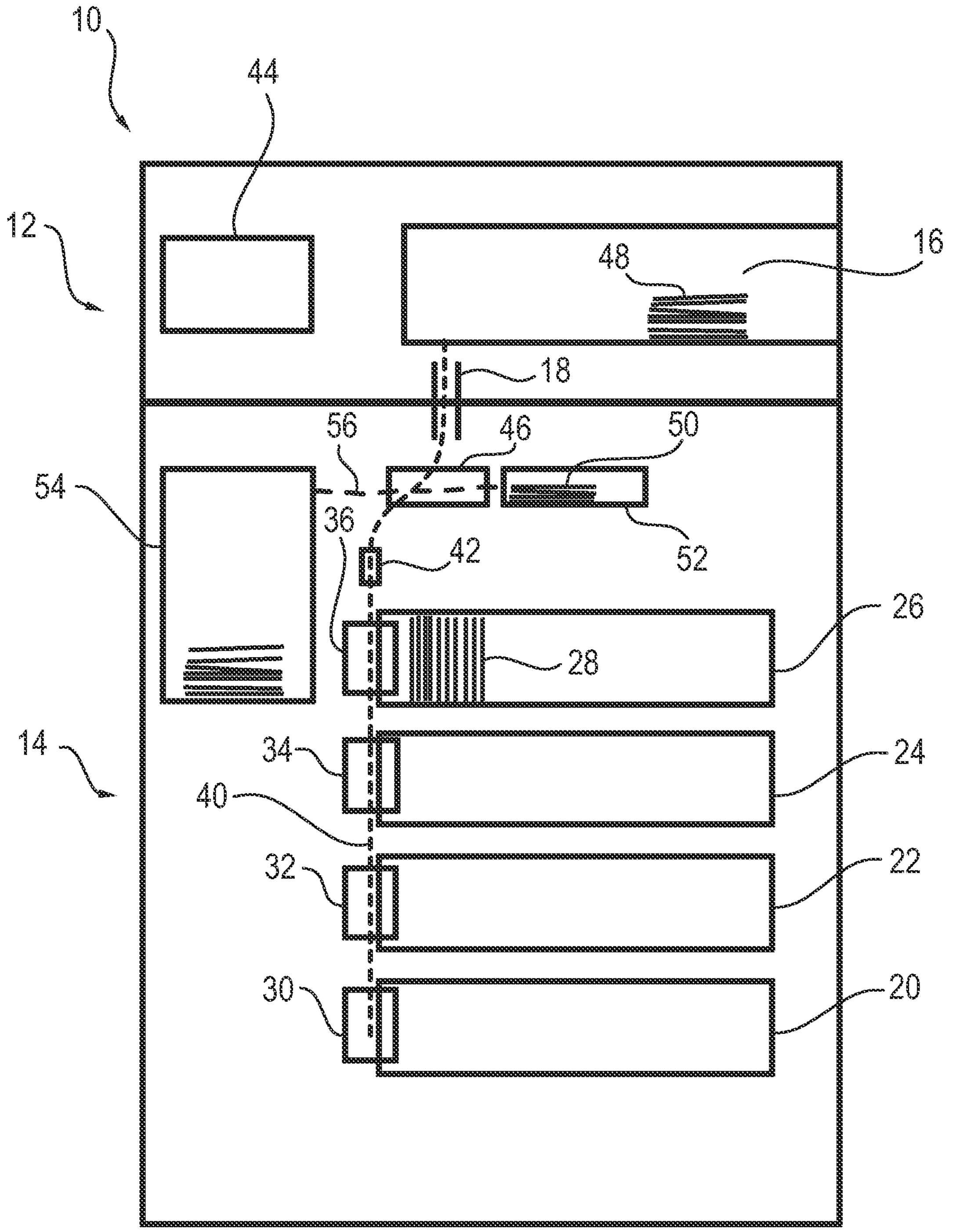
FIG. 1 shows a schematic illustration of a device for handling notes of value.

FIG. 1 shows a schematic illustration of a device 10 for handling notes of value. The device 10 comprises a head module 12 and a safe module 14. The head module 12 comprises a value note output unit 16 for the output of notes of value to be dispensed to a user.

Via a transfer opening 18, the notes of value are transported from the safe module 14 into the head module 12. The safe module 14 comprises four value note boxes 20 to 26 which serve to store and to transport notes of value.

The notes of value are deposited in the value note boxes 20 to 26 in the form of a stack. One of these stacks is exemplarily indicated in the first value note box 26. One of the notes of value of this value note stack is exemplarily identified with the reference sign 28. In the operating position of the value note boxes 20 to 26 shown in FIG. 1, the notes of value 28 are arranged upright on one of their edges in the value note boxes 20 to 26. Each value note box 20 to 26 has a non-illustrated opening for the removal of notes of value 28. In front of the opening of each value note box 20 to 26, a separating unit 30 to 36 is arranged, with the aid of which the notes of value 28 stored in the value note boxes 20 to 26 may be taken from the value note boxes 20 to 26 individually and can thus be separated.

As soon as a user initiates a withdrawal operation, notes of value 28 to be dispensed are taken from the respective value note boxes 20 to 26 and, after separation, are fed to a transport path 40. A sensor unit 42 is arranged along the transport path 40 and detects at least one feature of each note of value 28 to be dispensed. This feature may be a geometric feature, such as the thickness or the dimension of the note of value 28, with the aid of which in particular a double pull-off is detected. Alternatively or additionally, the sensor unit 42 may detect at least one safety feature of the note of value 28, in particular an optical safety feature, preferably an infrared color, a watermark, a safety thread, a serial number, and/or a microprinting. As a result, in particular counterfeit notes of value and/or notes of value of an invalid currency are detected.

The sensor unit 42 transmits a measuring value of the detected feature to a control unit 44 which is designed to determine depending on the detected feature whether the note of value 28 is a first note of value 48 approved for withdrawal or a second note of value 50 not approved for withdrawal. The control unit 44 controls the switch unit 46 such that the note of value 48 is fed to the value note output unit 16 when the note of value is a note of value 48 approved for withdrawal. If, however, the note of value is a note of value 50 that is not approved for withdrawal, the control unit

44 controls the switch unit 46 such that the note of value 50 is fed to an intermediate storage 52.

If, during a withdrawal operation, notes of value 50 that are not approved for withdrawal are detected with the aid of the sensor unit 42, only a part of the notes of value 48 removed from the value note boxes 20 to 26 is fed to the value note output unit 16 and the remainder of the notes of value 50 is fed to the intermediate storage 52. In order not to unnecessarily delay the withdrawal operation for the user, replacement notes of value are taken from the value note boxes 20 to 26 for the notes of value 50 that are not approved for withdrawal and, provided that these are approved for withdrawal, they are transported to the value note output unit 16. Thus, the desired total amount may be output to the user without interrupting the withdrawal operation. After termination of the withdrawal operation, the notes of value 50 that are not approved for withdrawal are fed via a further transport path 56 to a container 54, in particular a so-called reject container, which is preferably designed in the form of a further value note box.

Instead of the retract container 54, the device 10 may comprise a reject and retract container. The reject and retract container in particular comprises a first compartment for storing the sorted-out notes of value (so-called rejects) and a second compartment, that is separate from the first compartment, for storing notes of value that have not been removed from the output compartment (so-called retracts). Thus, the rejects and the retracts may be stored separately, as a result whereof note tracking is easier.

In an alternative embodiment, the device 10 may be designed as a recycling automated teller machine, i.e. as a device 10 for dispensing and depositing notes of value 28. In this embodiment, the sensor unit 42 also checks the features of the notes of value 28 which a user feeds via a value note output and input unit of the device 10. Notes of value 28 that are approved for deposit are fed to the value note boxes 20 to 26, notes of value that are not approved for deposit are fed to the intermediate storage 52 in accordance with the above-described method. In other embodiments, the device 10 may comprise more or less value note boxes 20 to 26, as well as separate reject and retract containers 54.

Figure 2:
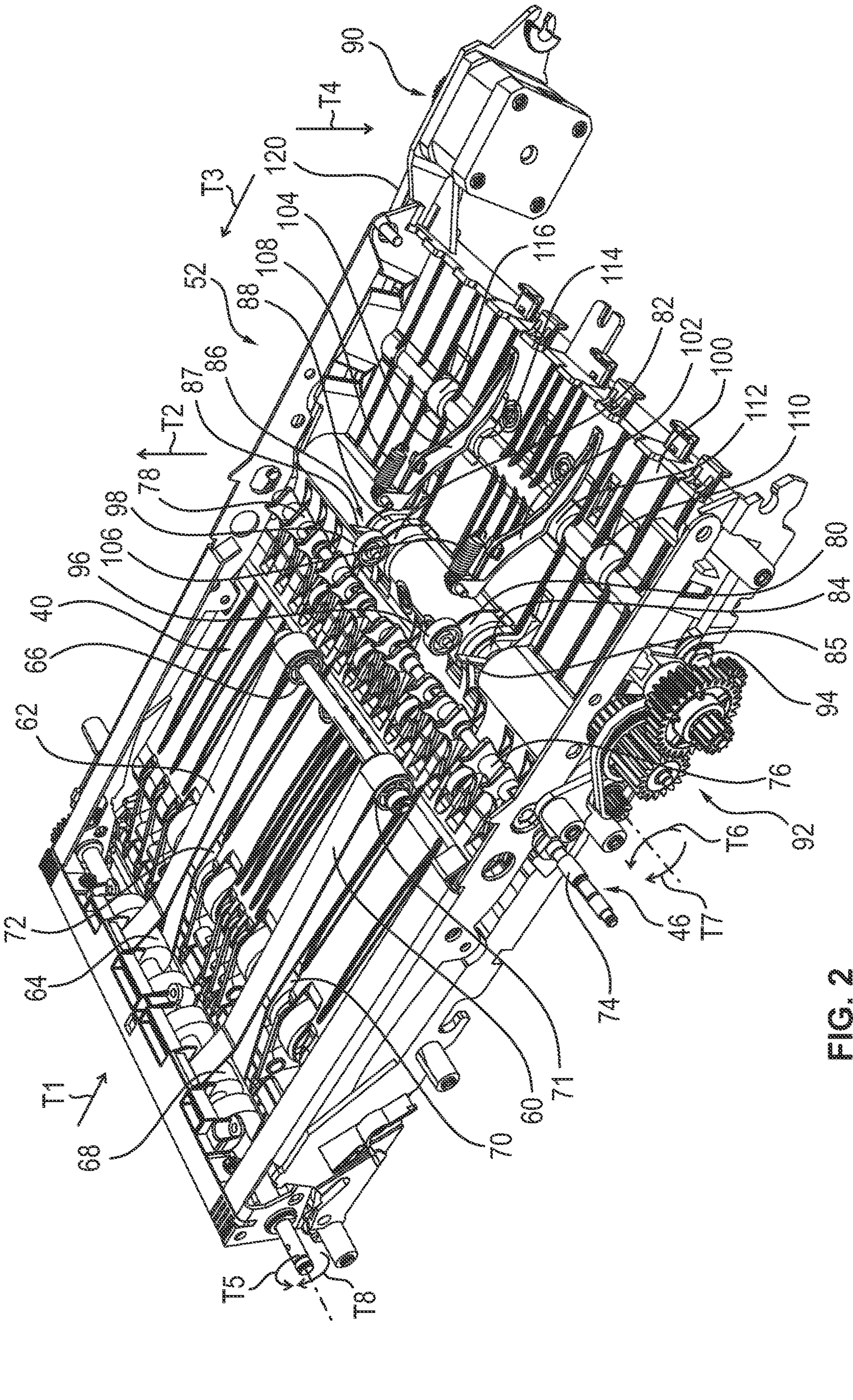
FIG. 2 shows a detailed view of an intermediate storage and a transport unit for notes of value of the device of FIG. 1.

FIG. 2 shows a detailed view of the intermediate storage 52 and a part of the transport path 40 for notes of value 28 of the device 10. Elements having the same function or the same structure are identified with the same reference signs. After passing through the sensor unit 42 described in connection with FIG. 1, the notes of value 48, 50 are fed to the switch unit 46 via the transport path 40 in the direction T1. The illustrated part of the transport path 40 is formed by two driven belts 60, 62, which are deflected over two rollers 64, 68, 71, 72, each serving as deflecting elements. The rollers 68 and 64 are in particular drivable with the aid of a non-illustrated drive unit in the direction T8 and in a second direction T5 opposite to the direction T8. Driving the rollers 68, 64 in the direction T5 causes a transport of the notes of value 48, 50 in the transport direction T1, driving the rollers 68, 64 in the direction T8 causes a transport of the notes of value 48, 50 in the transport direction T3. Two press-on rollers 70, 72 are arranged opposite to the belts 60, 62 such that the notes of value 48, 50 are transported between the belts 60, 62 and the press-on rollers 70, 72. The press-on rollers 70, 72 guarantee that the notes of value 48, 50 are pressed against the belts 60, 62 during the transport along the transport path 40 in the area of the belts 60, 62.

The switch unit 46 comprises a shaft 74 and a switch body 76 connected to the shaft 74 in a rotationally fixed manner. The switch body 76 comprises a plurality of switch fingers, one of which is exemplarily identified with the reference sign 78. When the note of value 28 fed to the switch unit 46 is a note of value 48 that is approved for withdrawal, the control unit 44 controls the switch unit 46 into a first switch body position such that the note of value 48 is transported in the direction T2 with the aid of a non-illustrated transport unit and is fed to the value note output unit 16. When, on the other hand, the note of value 50 is not approved for withdrawal, the control unit 44 controls the switch unit 46 into a second switch body position such that the note of value 50 is transported into the direction T1 and is fed to the intermediate storage 52. The change in the switch body position in particular takes place by the activation of a lifting magnet not illustrated in FIG. 2, which magnet is engaged with a shaft 74 such that given a movement of the armature of the lifting magnet the shaft 74 is rotated about its own longitudinal axis by a predetermined angle.

When activating the switch unit 46 into the second switch body position, the control unit 44 further activates a drive unit 90 which drives a shaft 88 via a drive belt 120. Two transport rollers 80, 82 and two vane wheels 84, 86 are arranged on the shaft 88 in a rotationally fixed manner, with the aid of which the note of value 50 is fed to the intermediate storage 52. In the illustration of FIG. 2, one vane 85, 87 each of altogether three vanes of each vane wheel 84, 86 is visible. The vanes 85, 87 in particular project perpendicularly from a hub of the respective vane wheel 84, 86. Opposite to each transport roller 80, 82, a non-driven counter pressure roller 96, 98 is arranged. It is guaranteed by the counter pressure rollers 96, 98 that the note of value 50 is pressed against the transport rollers during the transport with the aid of the transport rollers 80, 82 so that a safe transport of the note of value 50 into the intermediate storage 52 and out of the intermediate storage 52 is possible.

Via a gear arrangement 92, the shaft 88 is engaged with a further shaft 94 such that when the shaft 88 is driven, the shaft 94 rotates as well. Further transport rollers 110 to 116 are arranged on the shaft 94 in a rotationally fixed manner. The drive unit 90 is in particular designed such that the shaft 88 and thus also the shaft 94 may be driven in a direction T6 and in a second direction T7, wherein the drive is in the direction T7 when feeding the note of value 50 into the intermediate storage 52.

When feeding the notes of value 50 into the intermediate storage 52, the note of value 50 is guided between the transport rollers 80, 82 and the counter pressure rollers 96, 98 and deposited on a deposit surface 100 when no note of value 50 has been stored in the intermediate storage 52 yet. When, on the other hand, already at least one note of value 50 is deposited on the deposit surface 100 with its front or back, the newly fed note of value 50 is deposited on the note of value 50 or the notes of value 50 already deposited on the deposit surface 100 such that together with these notes of value 50 it forms a value note stack.

The vanes 85, 87 of the vane wheels 84, 86 are configured to exert a press-on force toward the deposit surface 100 on the note of value 50 stored in the intermediate storage 52 or on the value note stack stored in the intermediate storage 52 when the vane wheels 84, 86 are rotated in a direction T7. Further, two press-on elements 102, 104 are provided, which are pivotably connected to a cover element 130 illustrated in FIG. 4 and exert a press-on force on a note of value 50 or a value note stack stored in the intermediate storage 52 with the aid of elastically deformable elements 106, 108. The press-on elements 102, 104 in particular have the shape of a skid or a lever. The press-on elements 102, 104 are in particular arranged opposite to the transport rollers 112, 114 and contact these when no note of value 50 is deposited in the intermediate storage 52. With the aid of the press-on elements 102, 104, it is achieved that the notes of value 50 stored in the intermediate storage 52 are pressed in deposit direction T4 so that subsequent notes of value 50 may safely slide over an already deposited note of value 50 or value note stack.

Figure 3:
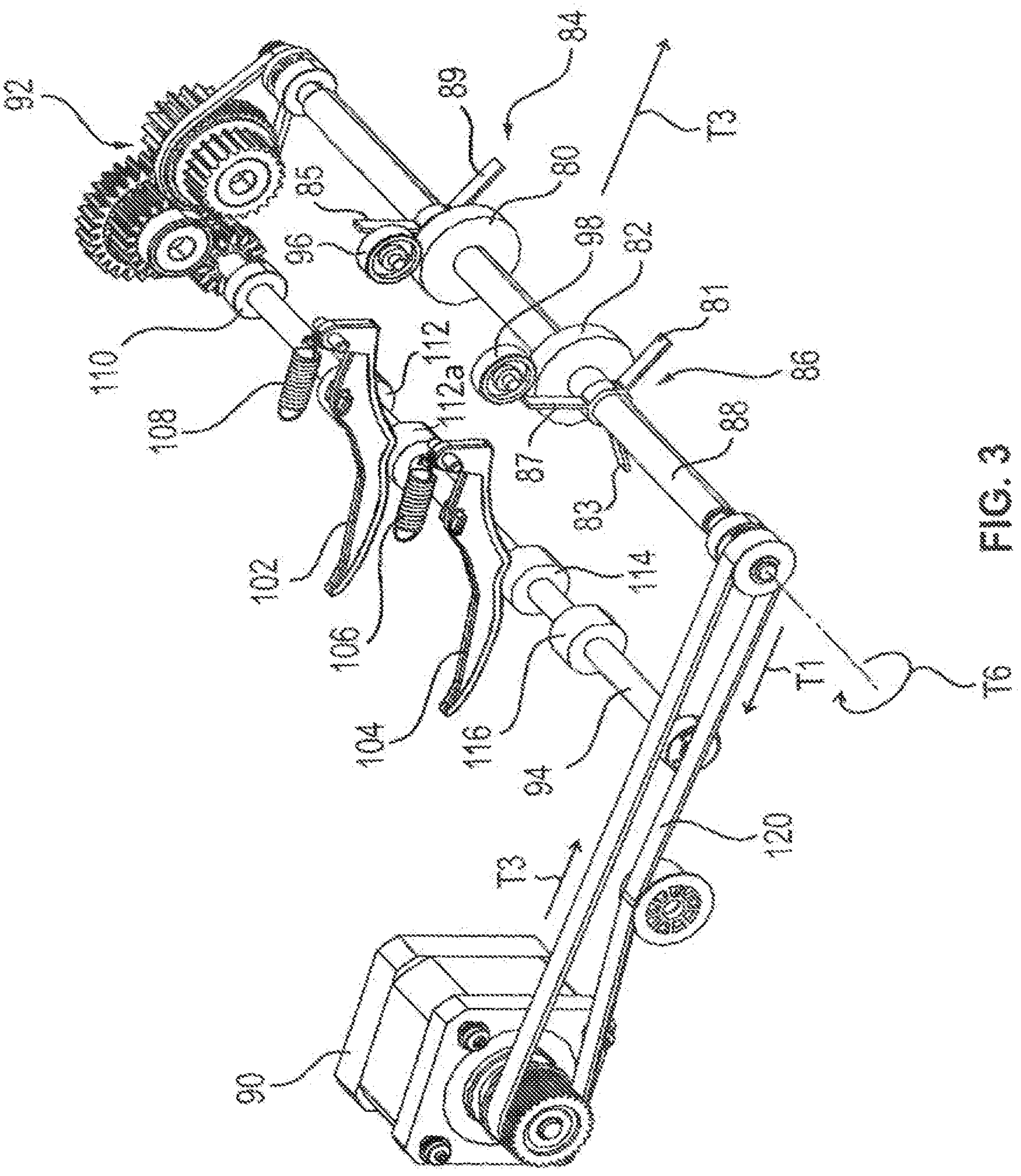
FIG. 3 shows a view of individual elements of the detailed view of FIG. 2.

FIG. 3 shows a view of individual elements of the detailed view of FIG. 2, which are provided for feeding the notes of value 50 in the direction T1 and for removing the note of value 50 or the value note stack from the intermediate storage 52 in the direction T3. As soon as the withdrawal operation of the user is terminated, the note of value 50 or value note stack deposited in the intermediate storage 52 is transported from the intermediate storage 52 into the retract container 54. For this back transport of the note of value 50 or the value note stack, the drive unit 90 is driven such that the shaft 88 and thus also the shaft 94 are driven in the direction T6.

The rotation of the shaft 88 in the direction T6 causes that the vanes of the vane wheels 84, 86, of which the vanes with reference signs 81, 83, 87 as well as 85, 89 are visible in the illustration of FIG. 3, lift the note of value 50 or the value note stack against the press-on force of the press-on elements 102, 104 away from the deposit surface 100. At the same time, the notes of value 50 are transported with the aid of the transport rollers 110 to 116 and 80, 82 in the direction T3 out of the intermediate storage 52, the transport speed or the circumferential speed of the transport rollers 80, 82 being slower than the transport speed or the circumferential speed of the transport rollers 110 to 116.

Figure 4:
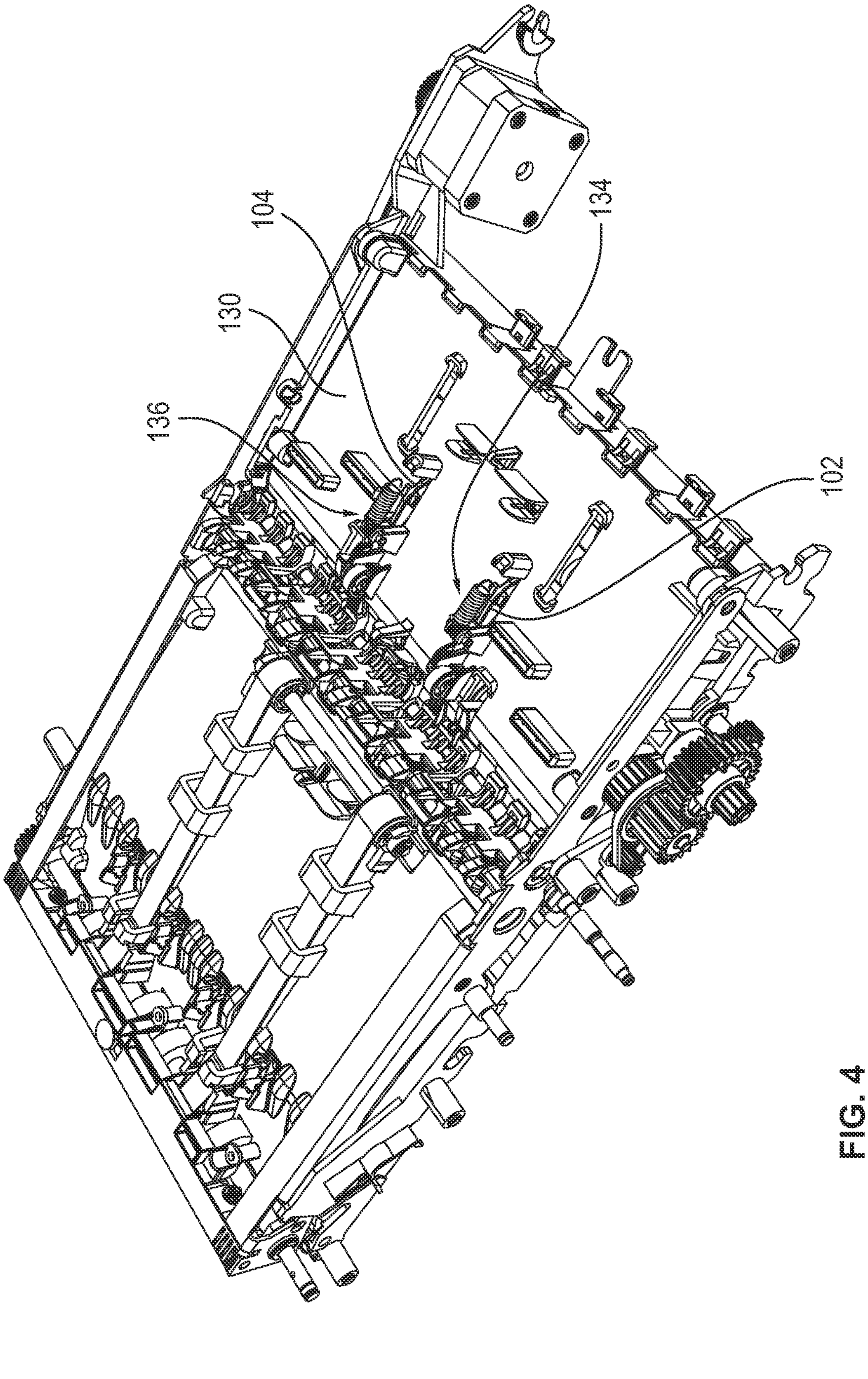
FIG. 4 shows a further detailed view of the intermediate storage and the transport unit of FIG. 2.

FIG. 4 shows a further detailed view of the intermediate storage 52 and the transport unit 40 of FIG. 2, which differs from the illustration of FIG. 1 in that a cover element 130 is arranged above the transport path and above the deposit surface 100 of the intermediate storage 52. FIG. 4 in particular shows the pivotable connections 134, 136 between the press-on elements 102, 104 and the cover element 130, as well as the connection of the elastic elements 106, 108 to the cover element 130.

In an alternative embodiment, the notes of value 50 are transported back from the intermediate storage 52 into the value note boxes 20 to 26 so that they are available for further withdrawal. In this embodiment, in front of each separating unit 30 to 36 one switch each is arranged, with the aid of which a note of value 50 to be fed to the value note boxes 20 to 26 is directed out of the transport path 40 and fed to a separating and feeding unit which is arranged in front of that value note box 20 to 26 into which the note of value 50 is to be transported.

Figure 5:
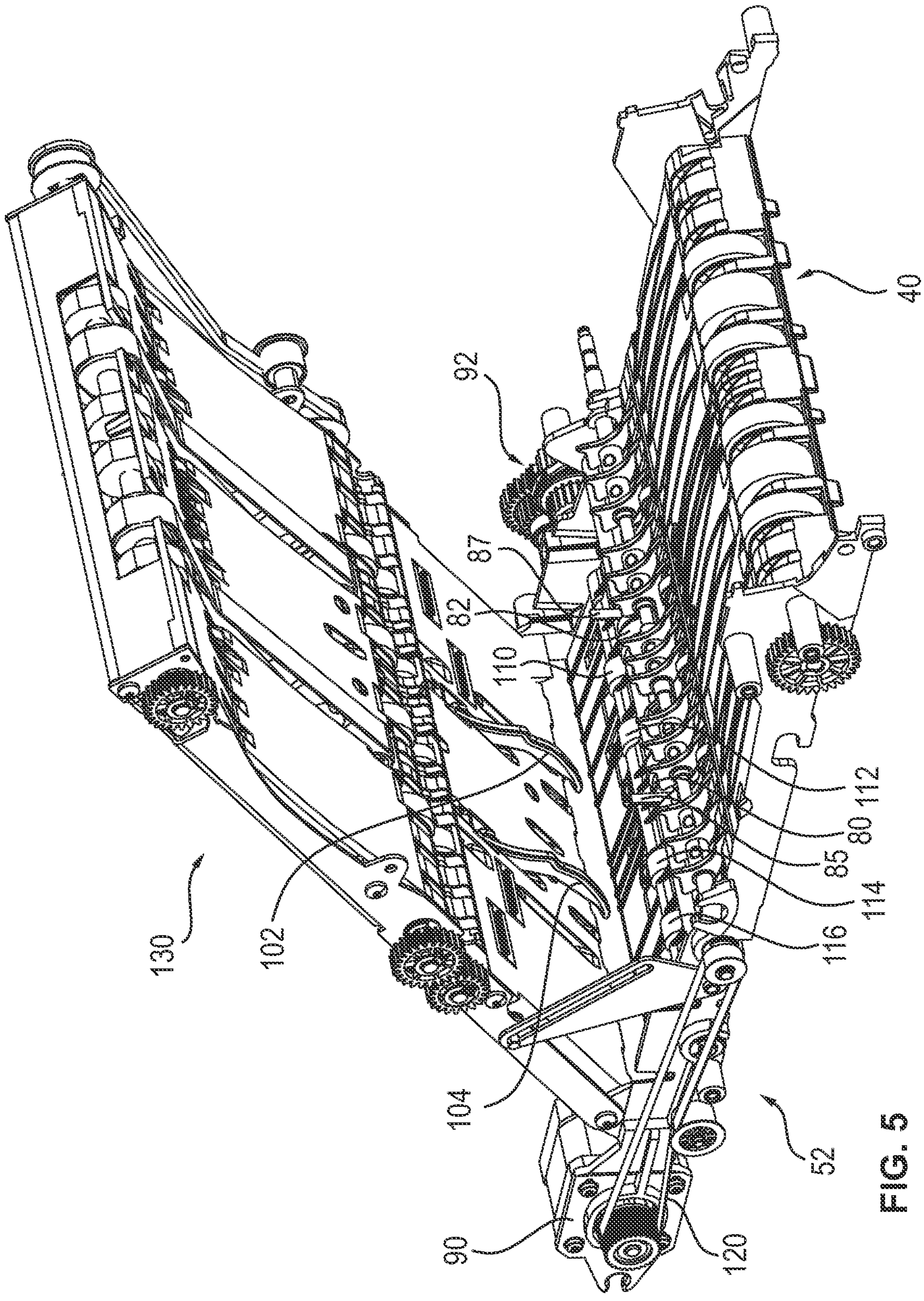
FIG. 5 shows a further detailed view of the intermediate storage and the transport unit of FIG. 2.

FIG. 5 shows a further detailed view of the intermediate storage 52 and the transport unit 40 of FIG. 2, in which the cover element 130 is pivoted relative to the deposit surface 100. The pivoting enables easy access to the intermediate storage 52 in particular during maintenance work and malfunctions.

Figure 6:
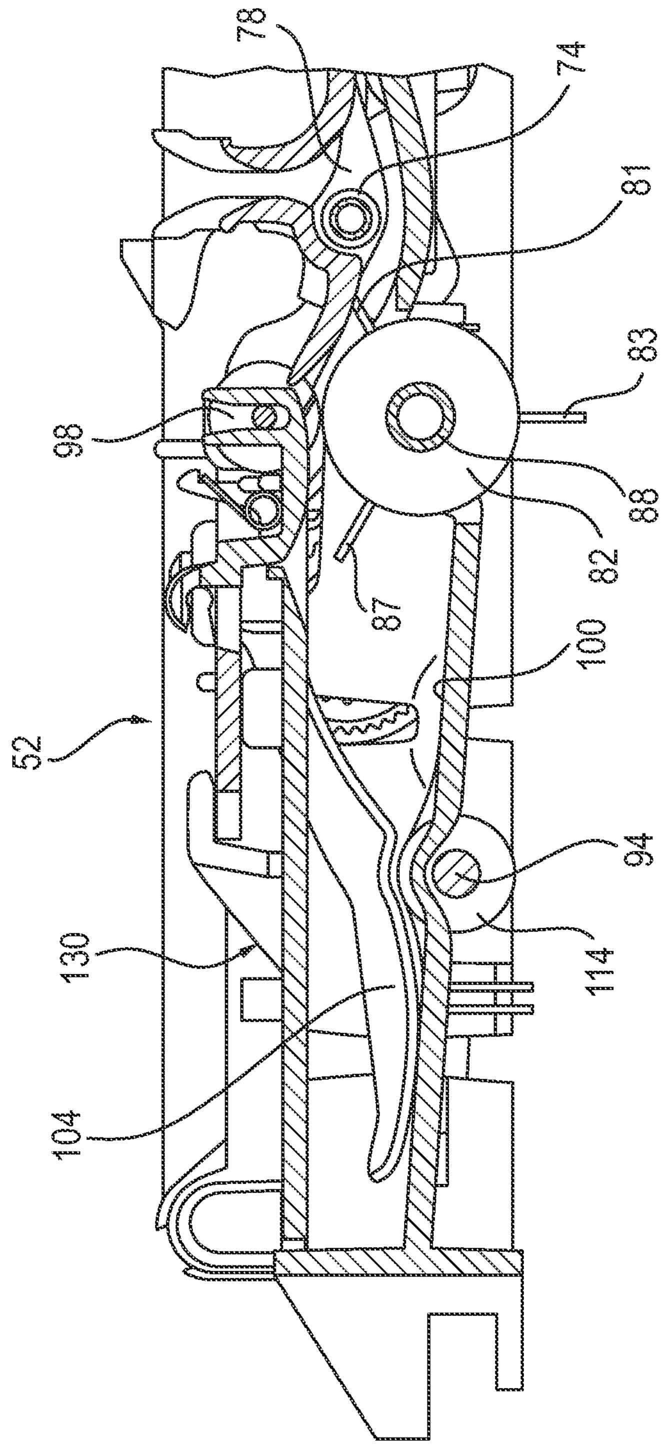
FIG. 6 shows a schematic sectional view of the intermediate storage of FIG. 2.
Figure 7:
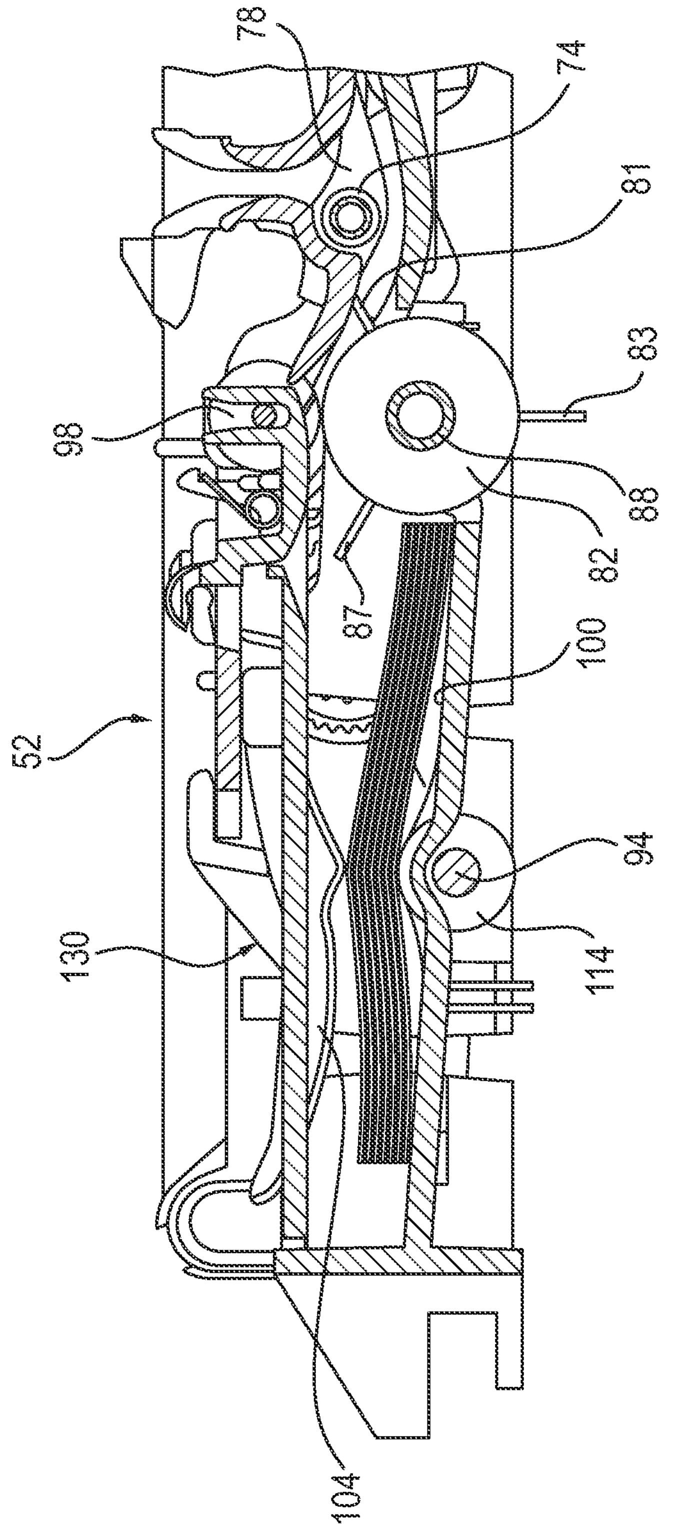
FIG. 7 shows a further schematic sectional view of the intermediate storage of FIG. 2.

FIG. 6 shows a schematic sectional illustration of the intermediate storage 52. In the illustration of FIG. 6, in particular no notes of value 50 are stored in the intermediate storage 52. FIG. 7 shows a further schematic sectional illustration of the intermediate storage 52, wherein in the illustration of FIG. 7 a value note stack is stored in the intermediate storage 52. When driving the shafts 88 and 94 in the direction T7, a further note of value 50 may be fed to the intermediate storage 52. When driven in the direction T6, the value note stack stored in the intermediate storage 52 is conveyed out of the intermediate storage 52 according to the method described in connection with FIG. 3.

Figure 6A:
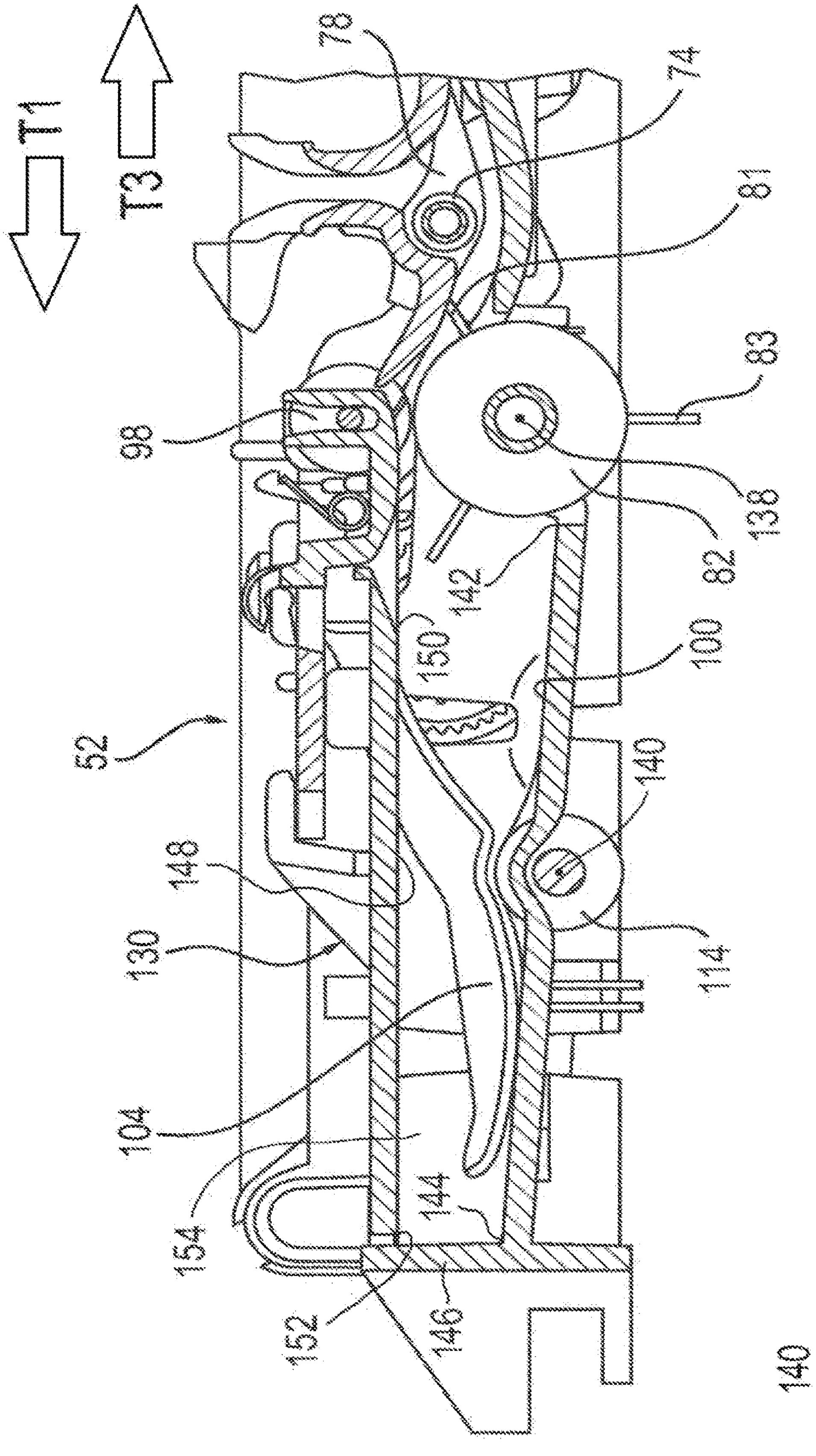
FIG. 6A shows a schematic sectional view of the intermediate storage of FIG. 2 similar to FIG. 6 but without certain structure(s) for clarity of the reminder.

The perspective of view of FIGS. 6 and 6A is a first plane normal to a first central longitudinal axis 138 of the first shaft 88 and to a second central longitudinal axis 140 of the second shaft 94. FIGS. 6 and 6A show the deposit surface 100 extending from a first edge 142, in the direction T1, away from the first central longitudinal axis 138, and past the second central longitudinal axis 140, to a second edge 144 at a wall 146 defined by the deposit element in the first plane. FIGS. 6 and 6A also show the cover element 130 defining a downwardly facing surface 148 in the first plane extending between a third edge 150 and a fourth edge 152 in the direction T1. The downwardly facing surface 148 confronts the deposit surface 100 between the first edge 142 and the second edge 144 along the direction T1. FIGS. 6 and 6A also show the wall 146 and the deposit surface 100 and the downwardly facing surface 148 are three sides of a volume 154 defined by the intermediate storage 52 for holding note(s) of value. The vanes 81, 83, 85, 87, 89 pass through the volume 154 when the first shaft 88 rotates.

FIGS. 6 and 6A also show the downwardly facing surface 148 and the deposit surface 100 diverge away from one another in the first plane from the wall 146 in the direction T3, which is opposite to the direction T1.

FIGS. 6 and 6A also show the downwardly facing surface 148 extends in a second plane normal to the first plane (148 is thus an edge in FIGS. 6 and 6A). FIGS. 6 and 6A also show the first central longitudinal axis 138 is closer to the second plane than the second central longitudinal axis 140. FIGS. 6 and 6A also show the first central longitudinal axis 138 is further from the wall 146 than the second central longitudinal axis 140.

FIGS. 6 and 6A also the second central longitudinal axis 140 is closer to the wall 146 than to the first central longitudinal axis 138.

FIGS. 6 and 6A also show the first central longitudinal axis 138 and the second central longitudinal axis 140 are disposed outside of the volume 154 and, between the first transport roller 82 and the second transport roller 114, only the second transport roller 114 projects into the volume 154.

FIG. 3 shows the vane wheels 84, 86 each extend a first distance along the first shaft 88, defining respective widths of each vane wheel 84, 86. FIG. 3 also shows the first transport rollers 80, 82 each extend a second distance along the first shaft 88, defining respective widths of each roller 80, 82. FIG. 3 also shows adjacent pairs of vane wheel and roller (84-80 and 86-82) are spaced from one another third distance along the first shaft 88 that is less than a sum of the first distance and the second distance.

FIG. 3 also shows the transport rollers 80, 82 are both positioned between the vane wheels 84 and 86 along the first shaft 88.

FIG. 3 also shows the press-on element 102 aligned with the roller 114 and the press-on element 104 aligned with the roller 112*a* so that the second note 50 of value, when positioned in the intermediate storage 52, is disposed between the transport roller 112*a* and the press-on element 102 and also between the roller 114 and the press-on element 104.

What is claimed is:

1. A device for handling notes of value comprising:

an intermediate storage configured to receive notes of value in a first rectilinear direction and having a deposit surface, a wall, and a cover element, wherein the cover element is arranged pivotably above the deposit surface about an axis of rotation transverse to the first rectilinear direction, wherein the cover element defines a downwardly facing surface, and wherein the wall and the deposit surface and the downwardly facing surface are three sides of a volume defined by the intermediate storage for holding the notes of value;

a transport unit drivable in a first rotational direction to move the notes of value in the first rectilinear direction into the intermediate storage and drivable in a second rotational direction opposite the first rotational direction to convey the notes of value out of the intermediate storage, wherein the transport unit includes a first shaft and at least one vane wheel with at least one vane arranged on the first shaft in a rotationally fixed manner, wherein the at least one vane of the at least one vane wheel is configured to exert a press-on force toward the deposit surface and on the notes of value fed into the intermediate storage and stored in the intermediate storage when the at least one vane wheel is rotated in the first rotational direction, wherein the at least one vane of the at least one vane wheel is configured to lift the notes of value fed into the intermediate storage away from said deposit surface when the at least one vane wheel is rotated in the second rotational direction; and wherein, in a first plane normal to a first central longitudinal axis of the first shaft, in the first rectilinear direction, the deposit surface extends from a first edge away from the first central longitudinal axis to a second edge at the wall, wherein the downwardly facing surface extends in the first plane between a third edge and a fourth edge in the first rectilinear direction, the downwardly facing surface confronting the deposit surface between the first edge and the second edge along the first rectilinear direction, and wherein the at least one vane passes through the volume when the first shaft rotates.

2. The device of claim 1 further comprising a sensor unit arranged along a transport path of at least one note of value to be dispensed and configured to detect at least one feature of the at least one note of value to be dispensed.

3. The device of claim 2 further comprising a control unit configured to distinguish depending on the at least one feature detected and transmitted by the sensor unit whether the at least one note of value is a first note of value approved for withdrawal or a second note of value not approved for withdrawal.

4. The device of claim 3 further comprising a switch unit where the control unit controls the switch unit such that upon distinguishing that the at least one is a note of value is a second note of value not approved for withdrawal, the at least one note of value is fed to the intermediate storage.

5. The device of claim 4 where the intermediate storage comprises a deposit element with a deposit surface and at least one press-on element which is configured to exert a press-on force toward the deposit surface on the at least one note of value fed to the intermediate storage.

6. The device of claim 5 where the at least one press-on element is connected pivotably to the cover element.

7. The device of claim 5 where the at least one note of value is fed to the intermediate storage by the transport unit.

8. The device of claim 4 further comprising at least one drive unit for driving the first shaft where when upon distinguishing that the at least one note of value is a second note of value not approved for withdrawal, the control unit activates the at least one drive unit to drive the first shaft.

9. The device of claim 1 further comprising at least one first transport roller, and at least one second transport roller, where the at least one first transport roller and the at least one vane wheel are arranged on a first shaft in a rotationally fixed manner and the at least one second transport roller is arranged on a second shaft in a rotationally fixed manner.

10. The device of claim 8 further comprising at least one first transport roller, and at least one second transport roller, where the at least one first transport roller and the at least one vane wheel are arranged on a first shaft in a rotationally fixed manner and the at least one second transport roller is arranged on a second shaft in a rotationally fixed manner where the at least one drive unit drives the first shaft and the second shaft, and where the first shaft and the second shaft are connected to each other via toothed gearing.

11. The device of claim 1 where the intermediate storage is arranged in a safe module.

12. The device of claim 8 where the intermediate storage comprises a deposit element with a deposit surface and at least one press-on element which is configured to exert a press-on force toward the deposit surface on the at least one note of value fed to the intermediate storage.

13. The device of claim 12 where the at least one press-on element is connected pivotably to the cover element.

14. The device of claim 13 further comprising at least one first transport roller, and at least one second transport roller, where the at least one first transport roller and the at least one vane wheel are arranged on a first shaft in a rotationally fixed manner and the at least one second transport roller is arranged on a second shaft in a rotationally fixed manner where the at least one drive unit drives the first shaft and the second shaft, and where the first shaft and the second shaft are connected to each other via toothed gearing.

15. The device of claim 13 where the intermediate storage is arranged in a safe module.

16. The device of claim 12 where the at least one note of value is fed to the intermediate storage by the transport unit.

17. The device of claim 16 further comprising at least one first transport roller, and at least one second transport roller, where the at least one first transport roller and the at least one vane wheel are arranged on a first shaft in a rotationally fixed manner and the at least one second transport roller is arranged on a second shaft in a rotationally fixed manner where the at least one drive unit drives the first shaft and the second shaft, and where the first shaft and the second shaft are connected to each other via toothed gearing.

18. The device of claim 16 where the intermediate storage is arranged in a safe module.

* * * * *